US007313600B1

(12) United States Patent
Tannous

(10) Patent No.: US 7,313,600 B1
(45) Date of Patent: Dec. 25, 2007

(54) ARRANGEMENT FOR EMULATING AN UNLIMITED NUMBER OF IP DEVICES WITHOUT ASSIGNMENT OF IP ADDRESSES

(75) Inventor: Sameer Tannous, Durham, NC (US)

(73) Assignee: Cisco Technology, Inc., San Jose, CA (US)

(*) Notice: Subject to any disclaimer, the term of this patent is extended or adjusted under 35 U.S.C. 154(b) by 1347 days.

(21) Appl. No.: 09/725,930

(22) Filed: Nov. 30, 2000

(51) Int. Cl.
*G06F 15/16* (2006.01)
(52) U.S. Cl. .................. 709/217; 709/224; 370/469
(58) Field of Classification Search ............ 709/206, 709/216–219, 223–232; 370/389–392, 466–469
See application file for complete search history.

(56) References Cited

U.S. PATENT DOCUMENTS

| 5,721,876 | A  | * | 2/1998  | Yu et al. ........................ 703/27 |
| 5,912,891 | A  | * | 6/1999  | Kanai ..................... 370/395.51 |
| 5,933,602 | A  | * | 8/1999  | Grover ........................ 709/224 |
| 5,996,016 | A  | * | 11/1999 | Thalheimer et al. ........ 709/227 |
| 6,091,732 | A  | * | 7/2000  | Alexander et al. .......... 370/401 |
| 6,314,531 | B1 | * | 11/2001 | Kram ........................... 714/38 |
| 6,389,462 | B1 | * | 5/2002  | Cohen et al. ................ 709/218 |
| 6,577,620 | B1 | * | 6/2003  | Galyas et al. ............... 370/352 |
| 6,633,560 | B1 | * | 10/2003 | Albert et al. ................ 370/351 |
| 6,701,448 | B1 | * | 3/2004  | Akyol et al. .................... 714/4 |
| 6,735,196 | B1 | * | 5/2004  | Manzardo ................... 370/386 |
| 6,822,955 | B1 | * | 11/2004 | Brothers et al. ............. 370/389 |
| 6,829,709 | B1 | * | 12/2004 | Acharya et al. ............ 713/160 |
| 6,993,026 | B1 | * | 1/2006  | Baum et al. ................. 370/392 |
| 2002/0055980 | A1 | * | 5/2002 | Goddard ...................... 709/217 |
| 2002/0112076 | A1 | * | 8/2002 | Rueda et al. ................ 709/245 |

OTHER PUBLICATIONS

J. Mogul, Efficient use of workstations for passive monitoring of local area networks, Proceedings of the ACM symposium on Communications architectures & protocols, pp. 253-263, Year of Publication: 1990, ISSN:0146-4833.*
Stephane Eranian, David Mosberger, The Making of Linux / ia64, Internet Systems and Applications Laboratory, HP Laboratories Palo Alto, HPL-1999-100, Aug. 1999.*
Stevens, "Networking APIs: Sockets and XTI", *UNIX Network Programming*, vol. 1, Second Edition, 1998, Prentice-Hall, Inc., Upper Saddle River, NJ.

* cited by examiner

*Primary Examiner*—Glenton B. Burgess
*Assistant Examiner*—Yasin M Barqadle
(74) *Attorney, Agent, or Firm*—Leon R. Turkevich

(57) ABSTRACT

A protocol emulator includes an executable emulation application configured for promiscuously detecting IP frames on a network interface. The executable emulation application generates response IP frames for each corresponding detected IP frame. The protocol emulator also includes a raw socket configured for outputting each response IP frame onto the network interface. Hence, the protocol emulator minimizes use of UNIX kernel resources by eliminating IP filtering of received IP frames from the network interface, and by using a raw socket for sending a response IP frame generated by the emulation application instead of the socket layer or the kernel. Hence, the minimal use of UNIX kernel resources enables scalable emulation of multiple logical IP addresses, effectively enabling an unlimited number of IP devices to be emulated without assignment of IP addresses to respective sockets.

26 Claims, 2 Drawing Sheets

ARRANGEMENT FOR EMULATING AN UNLIMITED NUMBER OF IP DEVICES WITHOUT ASSIGNMENT OF IP ADDRESSES

BACKGROUND OF THE INVENTION

1. Field of the Invention

The present invention relates to an arrangement for testing network-based systems by emulating network workstations having respective Internet Protocol (IP) addresses.

2. Description of the Related Art

Protocol emulators are often programmed in a UNIX environment for testing network devices that are designed to implement a prescribed protocol. Often there is a need to emulate multiple IP devices having respective IP addresses. Typically such emulation of multiple IP devices is accomplished by creating logical IP addresses, also referred to as alias IP addresses or secondary IP addresses, and binding each of the logical IP addresses to a socket using BSD (Berkeley Software Distribution) socket programming. In particular, different types of sockets may be created: stream sockets are used for character streams (TCP) for use by HTTP or FTP; and datagram sockets are used for (UDP) datagrams. Other types of sockets exist, for example raw sockets. Once the socket is created, the bind function is used to bind the socket to the corresponding logical IP address, enabling a UNIX kernel to provide Ethernet access to the logical IP address. Hence, a UNIX workstation can emulate multiple devices by binding multiple logical IP addresses to respective sockets for access to the UNIX kernel.

The above-described emulation approach, however, does not scale well for multiple logical IP addresses. In particular, each logical IP address takes up kernel resources because each corresponding socket requires a file descriptor. A typical UNIX kernel is unusable with more than several thousand file descriptors, hence the UNIX kernel cannot handle more than 1000 to 2000 logical IP addresses. Although more IP addresses can be handled by specialized kernel code provided by test vendors, such specialized kernel code is based on proprietary source code in conjunction with specialized test hardware from the test vendor. Since test vendors prefer not to provide the source code for the specialized kernel code, test engineers may have difficulty in modifying the kernel code for their own particular testing requirements. Hence, test engineers would need several months to modify the kernel code in order to perform the necessary test operations. Consequently, test engineers need to choose between testing systems under test by using only a limited number of IP addresses, and substantial delay of the systems under test.

SUMMARY OF THE INVENTION

There is a need for an arrangement that enables a protocol emulator to test network devices, configured to implement a prescribed protocol, using a substantially large number of IP addresses without the necessity of specialized kernel code.

There also is a need for an arrangement that enables a protocol emulator to emulate a substantially large number of IP addresses in a manner that minimizes resources of the UNIX kernel.

These and other needs are attained by the present invention, where a protocol emulator includes an executable emulation application configured for promiscuously detecting IP frames on a network interface. The executable emulation application generates response IP frames for each corresponding detected IP frame. The protocol emulator also includes a raw socket configured for outputting each response IP frame onto the network interface. Hence, the protocol emulator minimizes use of UNIX kernel resources by eliminating IP filtering of received IP frames from the network interface, and by using a raw socket for sending a response IP frame generated by the emulation application instead of the socket layer or the kernel. Hence, the minimal use of UNIX kernel resources enables scalable emulation of multiple logical IP addresses, effectively enabling an unlimited number of IP devices to be emulated without assignment of IP addresses to respective sockets.

One aspect of the present invention provides a method of emulating IP devices in a protocol emulator. The method includes promiscuously detecting IP frames on a network interface, and generating, for each corresponding detected IP frame, a response IP frame by an executable emulation application. The method also includes outputting each response IP frame by a raw socket onto the network interface. The promiscuous detection of IP frames on the network interface enables the protocol emulator to process all detected IP frames, independent of the destination IP address. Moreover, the generation of a response IP frame by the executable emulation application enables the emulation of an unlimited number of IP devices without assigning IP addresses, since the response IP frame can be generated, and output by the raw socket, without the use of existing kernel resources.

Another aspect of the present invention provides an emulator having a network interface, an executable emulation application, and a raw socket. The network interface is configured for receiving IP frames from a network, each received IP frame having a corresponding IP source address and a corresponding IP destination address. The executable emulation application is configured for promiscuously detecting the IP frames received by the network interface, and is configured for generating a response IP frame for each corresponding detected IP frame having a corresponding identified application request, independent of the corresponding IP source address within the detected IP frame. The raw socket is configured for outputting the response IP frame to the network interface for transmission on the network.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
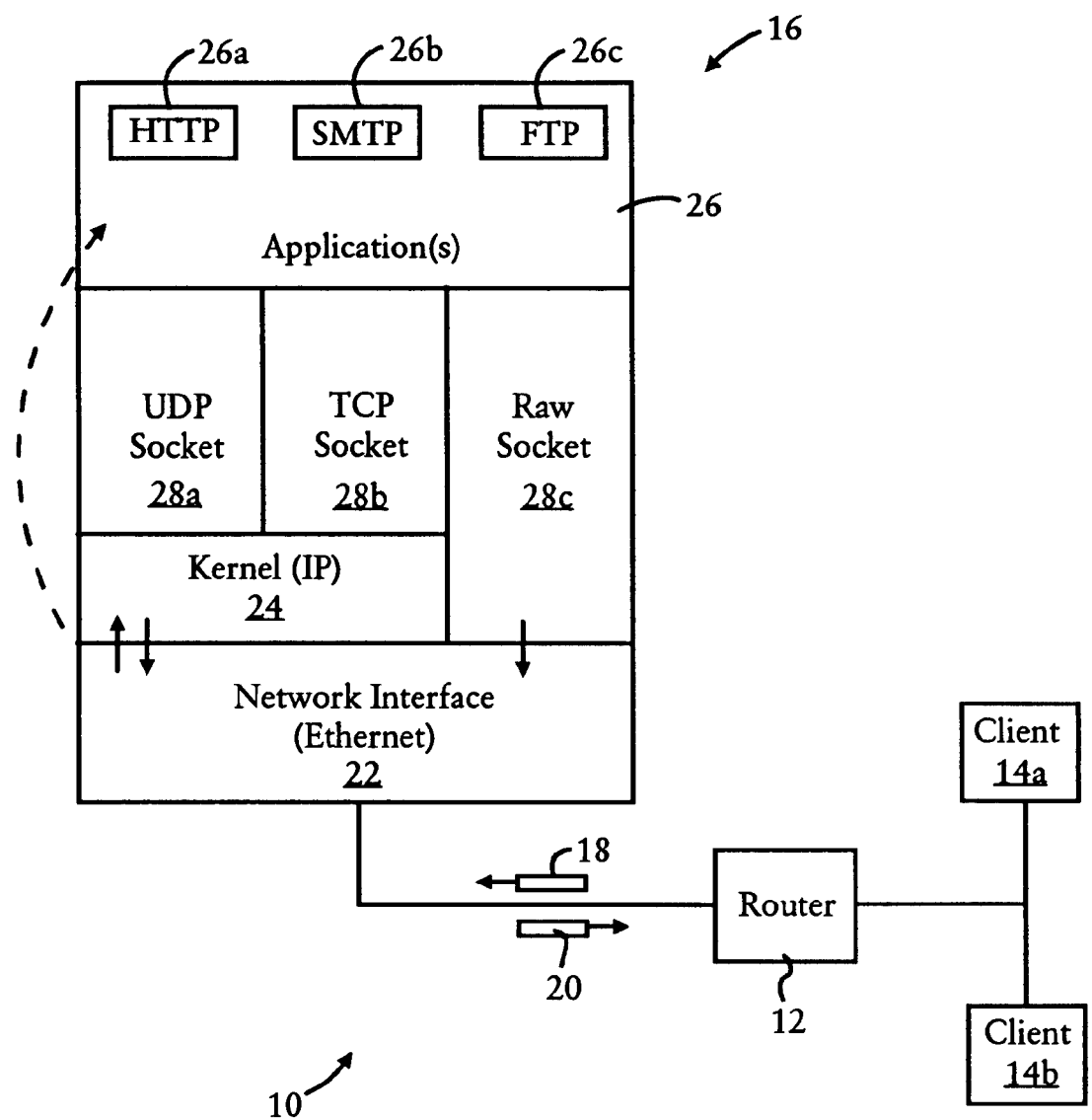
FIG. 1 is a diagram illustrating a network configured for testing a device that implements a particular protocol, using an emulator according to an embodiment of the present invention.

FIG. 1 is a block diagram illustrating a network 10 configured for testing a device 12 that implements a particular protocol, using an emulator 16 according to an embodiment of the present invention. In particular, the network 10 includes a device under test 12, for example a router, configured for implementing routing functions according to a prescribed protocol such as Internet protocol. The network 10 also includes client workstations 14 having respective assigned IP addresses and configured for generating IP frames 18 having respective client requests.

The network 10 also includes an emulator 16 configured for emulating an unlimited number of IP devices. As described below, the router 12 is configured for passing all received IP frames 18 to the emulator 16, independent of the destination IP address specified within the IP frame 18. For example, the router 12 may be configured for static routing; alternately the emulator 16 may be configured for responding to address resolution protocol (ARP) requests using its assigned media access control (MAC) address to ensure that the emulator 16 receives all IP traffic. Hence, the emulator 16 is able to receive all IP frames generated by the client workstations 14, even if the IP frames specify IP addresses which are not present on the network 10.

The emulator 16 is configured for promiscuously detecting the presence of the IP frames 18 on the network 10, and generating response IP frames 20 that include responses to the respective client requests, independent of the destination IP addresses within the detected IP frames 18. In particular, the emulator 16 includes a network interface 22, a UNIX-based kernel 24, at least one executable emulation application 26, and UNIX based sockets 28 configured for binding the executable emulation application 26, described in detail below.

The network interface 22 is configured for sending and receiving data frames according to Ethernet protocol: the network interface 22, upon receiving an Ethernet frame carrying an IP frame, removes the Ethernet header and forwards the IP frame to the kernel 24. Normally the kernel 24 is configured for dropping a received IP packet 18 if the destination IP address in the received IP packet 18 does not match the prescribed assigned IP address of the protocol emulator 16. However, the kernel 24 can be configured for forwarding all IP frames, independent of the destination IP address of the received IP frame, to the executable emulation application 26 via the appropriate socket 28a or 28b for processing. Alternately, the applications 26 can be configured for snooping for the received IP frames directly from the network interface 22.

At least one executable emulation application 26 is executed by the emulator 16 for responding to the requests specified in the received IP packet 18: as described above, the executable emulation application 26 is configured for promiscuously detecting the IP frames received by the network interface 22, either by directly snooping the network traffic received by the network interface 22, or by receiving the IP frames from the modified kernel 24 independent of the destination IP address.

The at least one executable emulation application 26, in response to receiving an IP frame having an identified application request, generates a response IP frame 20 that includes application response data such as HTML page data, and a response IP header. In particular, the executable emulation application 26 generates a response IP header by switching the source and destination IP addresses from the received IP frame 18. Hence, the response IP header specifies a response IP source address matching the IP destination address of the detected IP frame 18, and an IP destination address matching the IP source address of the detected IP frame 18. The executable emulation application 26 also generates any necessary layer 4 information (e.g., TCP or UDP header information) for the response IP frame 20.

As illustrated in FIG. 1, the executable emulation application 26 may be implemented as multiple emulation applications, each configured for generating a corresponding response IP frame for a detected IP frame based on the corresponding identified application request, independent of the IP source address within the detected IP frame 18. For example, an HTTP process 26a may be configured for providing at least a portion of an HTML page in response to an HTTP get request; an SMTP process 26b may be configured for supplying an e-mail message in response to a client request from one of the workstations 14; or an FTP process 26c may be configured for transfer of a file in response to an FTP request.

As described above, the executable emulation application 26 generates the application response data (e.g., the HTML page data), any necessary layer 4 headers such as TCP or UDP headers, and the IP header including the IP source address, IP destination address, etc. to form the IP response frame 20. The executable emulation application 26 then forwards the IP response frame 20 to a raw socket 28c configured for outputting the response IP frame 20 to the network interface 22 for transmission on the network 10.

The raw socket 28c receives the response IP frame 20, and generates the appropriate Ethernet header including MAC source address and MAC destination address, as well as any error correction (e.g., cyclic redundancy check or frame check sequence). Hence, the raw socket 28c bypasses the TCP/UDP header processing by the sockets 28a and 28b, as well as the IP header processing by the kernel 24. The raw socket 28c can be developed using BSD socket programming, known in the art.

Hence, the generation of layer 4 and IP headers by the emulation application 26, as well as the use of a raw socket 28c, minimizes processing requirements for the kernel 24 or the sockets 28a and 28b; hence, an unlimited number of IP devices may be emulated by the emulator 16.

Figure 2:
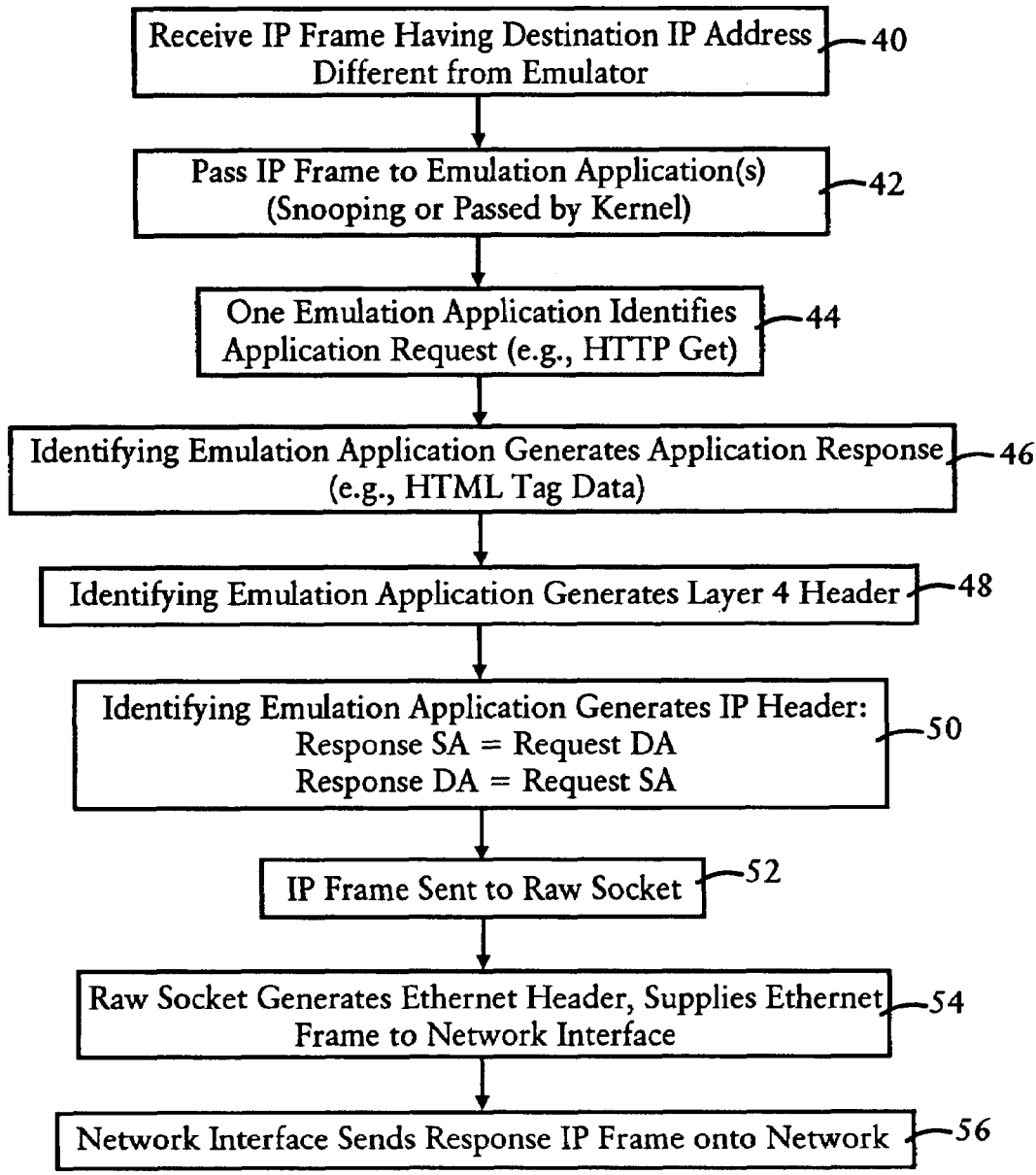
FIG. 2 is a diagram illustrating a method of emulating an unlimited number of IP devices by the emulator of FIG. 1, without the assignment of IP addresses, according to an embodiment of the present invention.

FIG. 2 is a diagram illustrating a method of emulating an unlimited number of IP devices by the emulator of FIG. 1, without the assignment of IP addresses, according to an embodiment of the present invention. The steps described in FIG. 2 can be implemented as executable code stored on a computer readable medium (e.g., a hard disk drive, a floppy drive, a random access memory, a read only memory, an EPROM, a compact disc, etc.).

The method begins in step 40, where the network interface 22 receives from the network 10 an IP frame 18 having a destination IP address that differs from the prescribed assigned IP address of the emulator 16. The received IP frame is then passed to the emulation application 26 in step 42, for example by snooping by the emulation application 26, or by passing the received IP frame by the kernel 24 upon modification thereof to pass all IP frames to the application 26, independent of the destination IP address specified in the received IP frame.

The emulation applications 26 executing within the application runtime parse the contents of the IP frame to obtain the IP source address, the IP destination address, any layer 4 information, and the application request within the IP frame (e.g., an HTTP get request) from one of the client workstations 14. One of the emulation applications 26 will identify the application request in step 44 and process that request, and the remaining emulation applications that cannot recognize the application request will discard the IP frame. In this example, the HTTP process 26a recognizes in step 44 the HTTP get request, and generates in step 46 an application response that includes the necessary HTML tag data in response to the HTTP get request.

The identifying emulation application (e.g., the HTTP process 26a) then generates in step 48 the appropriate layer 4 header, and generates in step 50 the IP header for the response IP frame 20. In particular, the identifying emulation application 26 generates an IP source address (SA) having a value corresponding to the IP destination address (DA) in the detected IP frame 18; the identifying emulation application 26 also generates an IP destination address (DA) having a value corresponding to the IP source address in the detected IP frame 18. After generating the IP header, the identifying emulation application 26 sends the IP frame in step 52 to the raw socket 28c.

The raw socket 28c, in response to receiving the response IP frame 20 from the emulation application 26, generates in step 54 the Ethernet header and any necessary error correction fields, and sends the Ethernet frame to the Ethernet network interface 22 for transmission in step 56 onto the network 10.

According to the disclosed embodiment, an unlimited number of IP devices can be emulated to respond to IP traffic, without the necessity of additional hardware or substantial loading of existing software resources. Hence, the disclosed embodiment provides a scalable arrangement that enables large, complex environments to be emulated using software code, resulting in substantial cost savings. Moreover, the disclosed arrangement is usable for multiple emulation applications 26 executing respective emulation application operations that selectively respond to different client requests. In addition, the disclosed arrangement can easily be implemented in software, enabling the emulator 16 to be easily implemented in existing UNIX-based workstations.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of emulating IP devices in a protocol emulator, the method comprising:
    promiscuously detecting IP frames on a network interface;
    generating, for each corresponding detected IP frame, a response IP frame by an executable emulation application; and
    outputting each said response IP frame by a raw socket onto the network interface;
    wherein the protocol emulator has a prescribed assigned IP address and a kernel configured for detecting IP frames, the promiscuously detecting step including one of: (1) passing by the kernel the detected IP frames to the executable emulation application independent of any specified IP destination address, including any IP destination addresses different from the prescribed assigned IP address, or (2) monitoring by the executable emulation application for the detected IP frames received by the network interface.

2. The method of claim 1, wherein the generating step includes:
    determining from each detected IP frame the corresponding supplied IP source address and supplied IP destination address;
    generating an IP header for the corresponding response IP frame having a response IP source address and a response IP destination address, the response IP source address having a value corresponding to the supplied IP destination address and the response IP destination address having a value corresponding to the supplied IP source address.

3. The method of claim 2, wherein the generating step further includes generating application response data based on parsed application request data within the corresponding detected IP frame.

4. The method of claim 3, wherein the parsed application request data includes a hypertext transfer protocol (HTTP) get request, the step of generating application response data including providing HTML page data in the corresponding response IP frame based on the HTTP get request.

5. The method of claim 2, wherein the generating step further includes generating, for the corresponding response IP frame, layer 4 header information by the executable emulation application.

6. The method of claim 2, wherein the generating step further includes:
    identifying the parsed application request data by one of a plurality of available executable emulation applications; and
    generating the application response data and the response IP frame for the parsed application request data by the one available executable emulation application.

7. The method of claim 1, wherein the promiscuously detecting includes monitoring by the executable emulation application for an identifiable application request within the detected IP frames, the executable emulation application generating application response data for the response IP frame based on the identifiable application request.

8. The method of claim 1, wherein the promiscuously detecting includes monitoring by a plurality of available executable applications for respective prescribed application requests within the detected IP frames.

9. The method of claim 8, wherein the generating step includes generating application response data for the response IP frame by one of the available executable applications having identified the corresponding prescribed application request.

10. The method of claim 1, wherein the passing step includes configuring the kernel to pass the detected IP frames having the destination addresses different from the prescribed assigned IP address.

11. The method of claim 1, wherein the promiscuously detecting, generating, and outputting each are performed in the protocol emulator.

12. An emulator comprising:
    a network interface configured for receiving IP frames from a network, each received IP frame having a corresponding IP source address and a corresponding IP destination address;
    an executable emulation application configured for promiscuously detecting the IP frames received by the network interface, the executable emulation application configured for generating a response IP frame for each corresponding detected IP frame having a corresponding identified application request, independent of the corresponding IP source address within the detected IP frame; and a raw socket configured for outputting the response IP frame to the network interface for transmission on the network;

wherein the executable emulation application is configured for generating the response IP frame by generating a response IP source address and a response IP destination address, the response IP source address having a value matching the IP destination address of the corresponding detected IP frame, and the response IP destination address having a value matching the IP source address of the corresponding detected IP frame.

13. The emulator of claim 12, wherein the executable emulation application is further configured for generating application response data based on parsed application request data within the corresponding detected IP frame.

14. The emulator of claim 13, wherein the parsed application request data includes a hypertext transfer protocol (HTTP) get request, the executable emulation application configured for generating, within the application response data, HTML page data based on the HTTP get request.

15. The emulator of claim 12, wherein the executable emulation application generates layer 4 header information for the response IP frame.

16. An emulator comprising:
a network interface configured for receiving IP frames from a network, each received IP frame having a corresponding IP source address and a corresponding IP destination address;
an executable emulation application configured for promiscuously detecting the IP frames received by the network interface, the executable emulation application configured for generating a response IP frame for each corresponding detected IP frame having a corresponding identified application request, independent of the corresponding IP source address within the detected IP frame;
a raw socket configured for outputting the response IP frame to the network interface for transmission on the network; and
a plurality of available executable emulation applications, each configured for generating a corresponding response IP frame for said each corresponding detected IP frame based on the corresponding identified application request, independent of the corresponding IP source addresses within the detected IP frame, wherein the response IP frame for each corresponding detected IP frame is generated by a corresponding one of the available executable emulation applications.

17. The emulator of claim 16, further comprising a kernel configured for passing the detected IP frames from the network interface toward the executable emulation application independent of any specified IP destination addresses.

18. The emulator of claim 16, wherein the executable emulation application is configured for promiscuously detecting the detected IP frames by monitoring for the received IP frames received by the network interface.

19. An emulator system comprising:
means for promiscuously detecting IP frames on a network interface;
means for generating, for each corresponding detected IP frame, a response IP frame by an executable emulation application; and
means for outputting each said response IP frame by a raw socket onto the network interface;
wherein the emulator system has a prescribed assigned IP address and a kernel configured for detecting IP frames based on an IP source address, the promiscuously detecting means configured for passing the detected IP frames independent of any specified IP destination address, including any IP destination addresses different from the prescribed assigned IP address.

20. The system of claim 19, wherein the generating means includes:
means for determining from each detected IP frame the corresponding supplied IP source address and supplied IP destination address;
means for generating an IP header for the corresponding response IP frame having a response IP source address and a response IP destination address, the response IP source address having a value corresponding to the supplied IP destination address and the response IP destination address having a value corresponding to the supplied IP source address.

21. The system of claim 20, wherein the generating means further is configured for generating application response data based on parsed application request data within the corresponding detected IP frame.

22. The system of claim 20, wherein the generating means is configured for generating, for the corresponding response IP frame, layer 4 header information by the executable emulation application.

23. The system of claim 20, wherein the generating means is configured for:
identifying the parsed application request data by one of a plurality of available executable emulation applications; and
generating the application response data and the response IP frame for the parsed application request data by the one available executable emulation application.

24. The system of claim 19, wherein the generating means monitors for an identifiable application request within the detected IP frames, and generates the application response data for the response IP frame based on the identifiable application request.

25. The system of claim 19, wherein the generating means includes a plurality of available executable applications for monitoring respective prescribed application requests within the detected IP frames.

26. The system of claim 25, wherein the generating means is configured for generating application response data for the response IP frame by one of the available executable applications having identified the corresponding prescribed application request.

* * * * *